United States Patent
Buell

[19]

[11] Patent Number: 6,105,701
[45] Date of Patent: Aug. 22, 2000

[54] MOTORCYCLE WITH COOLING AIR CHANNELS

[75] Inventor: Erik F. Buell, Mukwonago, Wis.

[73] Assignee: Buell Motorcycle Company, East Troy, Wis.

[21] Appl. No.: 09/362,457

[22] Filed: Jul. 28, 1999

[51] Int. Cl.$^7$ ...................................................... B60H 1/30
[52] U.S. Cl. ............................................................ 180/229
[58] Field of Search ................................. 180/229, 219, 180/68.1, 68.2

[56] References Cited

U.S. PATENT DOCUMENTS

| | | | |
|---|---|---|---|
| 4,445,587 | 5/1984 | Hillman | 180/229 |
| 4,637,486 | 1/1987 | Iwai | 180/225 |
| 4,648,474 | 3/1987 | Shinozaki et al. | 180/219 |
| 4,818,012 | 4/1989 | Kohama et al. | 296/78.1 |
| 4,830,135 | 5/1989 | Yamashita | 180/229 |
| 4,913,256 | 4/1990 | Sakuma | 180/229 |
| 4,964,484 | 10/1990 | Buell | 180/219 |
| 5,660,243 | 8/1997 | Anzalone et al. | 180/68.1 |

*Primary Examiner*—Brian L. Johnson
*Assistant Examiner*—Tony Winner
*Attorney, Agent, or Firm*—Michael Best & Friedrich LLP

[57] ABSTRACT

A motorcycle includes a fuel cell assembly having a fuel tank and a cover disposed over the fuel tank. The cover includes a pair of air inlets, and an air channel is defined between the cover and the tank for the flow of air. Such air flow is directed along the sides of the motorcycle engine between the rider's legs and the engine. The motorcycle also includes an air scoop defining an air duct. The air scoop has an intake end and an outlet end. The air flowing through the duct is directed toward the rear cylinder of the motorcycle.

17 Claims, 7 Drawing Sheets

MOTORCYCLE WITH COOLING AIR CHANNELS

FIELD OF THE INVENTION

The invention relates to cooling systems for motorcycle engines. More particularly, the invention relates to air cooling systems for motorcycle engines.

BACKGROUND

Motorcycle engines tend to heat up while in use, and typically rely at least in part on a flow of air over the engine and/or radiator to cool the engine. In one particular type of engine, the two-cylinder V-twin engine, the cylinders are commonly provided with fins to provide a large surface area for heat transfer from the engine to the air flowing over the engine. During such heat transfer, the air flowing over the engine is heated, which may cause discomfort to a motorcycle rider due to the proximity of the rider's legs to the engine.

Additionally, some motorcycle engines have one cylinder disposed behind another cylinder with respect to the direction of travel of the motorcycle. This is true of many V-twin motorcycle engines, as well as other multi-cylinder motorcycle engines. In such cases where one cylinder is disposed in front of another cylinder, the front cylinder may block the flow of air to the rear cylinder, causing the rear cylinder to become hotter than the front cylinder. Such uneven heating of the cylinders may result in one cylinder performing differently than the other cylinder, which may lead to inefficiencies in engine operation.

SUMMARY

The present invention provides a motorcycle having a fuel cell assembly including a tank and a cover disposed over a portion of the tank. The fuel cell assembly defines at least one air inlet and at least one channel extending rearwardly from the air inlet to an air outlet that directs air out of the channel.

Preferably, the channel is defined at least partially above the tank, and the outlet directs air generally parallel to at least one of the side surfaces of the motorcycle's engine. The motorcycle may also include two channels associated with two inlets. The inlet may be formed in the top surface of the cover. An elongated strip of foam having an adhesive backing is preferably affixed to a portion of the cover to at least partially define the channel. Preferably, the fuel cell is positioned between the seat and handlebars of the motorcycle. Preferably, the air channel is adapted to direct air between the engine and a leg of a rider on the motorcycle.

The present invention also provides a motorcycle having front and rear cylinders, and an air duct that directs a flow of air toward the rear cylinder.

Advantageously, the motorcycle of the present invention provides a flow of air to draw heat from the side surfaces of the engine and increase the comfort of the motorcycle rider. The invention also provides a flow of air directed toward the rear cylinder of the engine, which may better equalize the performances of the front and rear cylinders and the overall efficiency of the engine.

Other features and advantages of the invention will become apparent to those skilled in the art upon review of the following detailed description, claims, and drawings.

Figure 1:
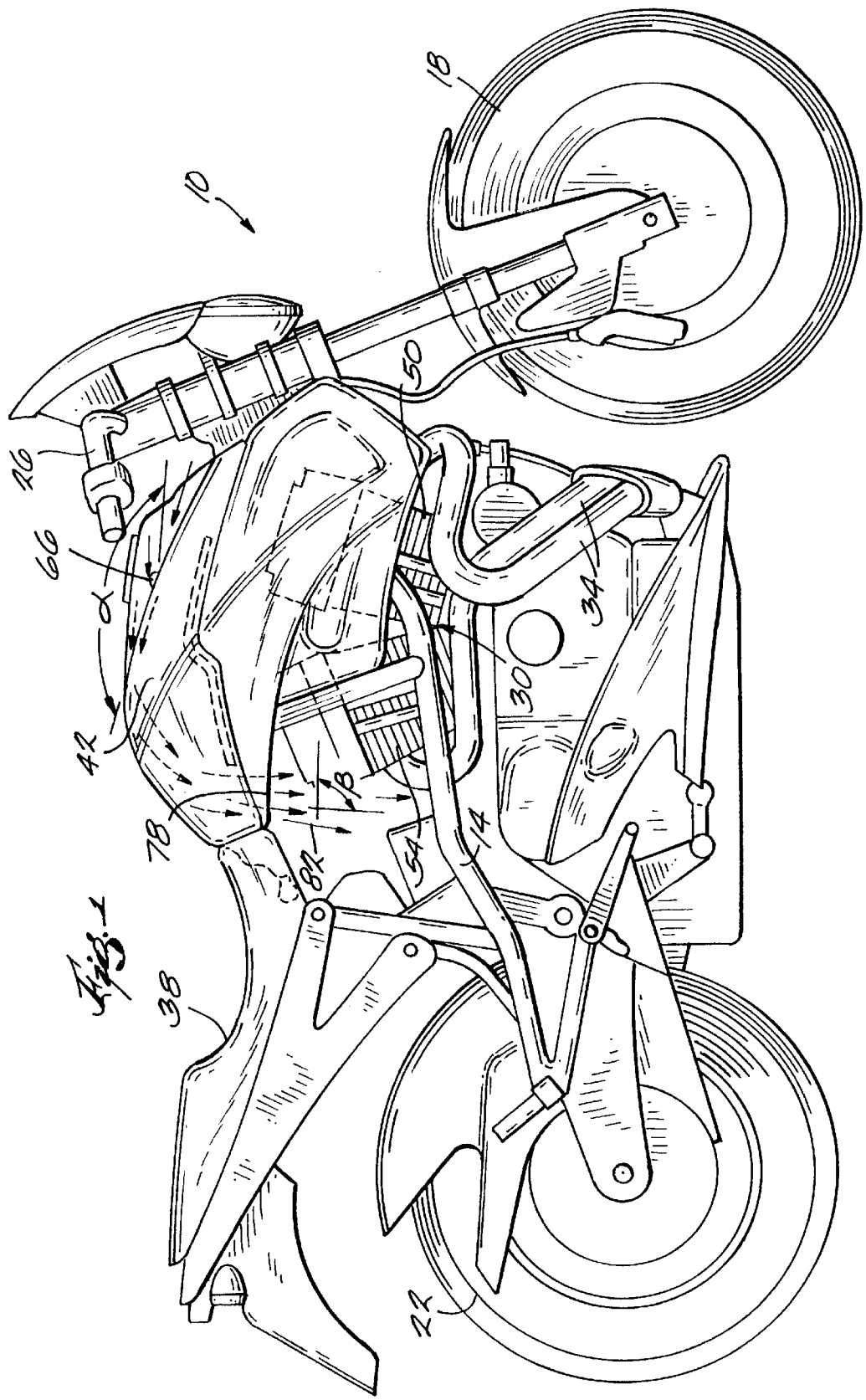
FIG. 1 is a right side elevational view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

Figure 2:
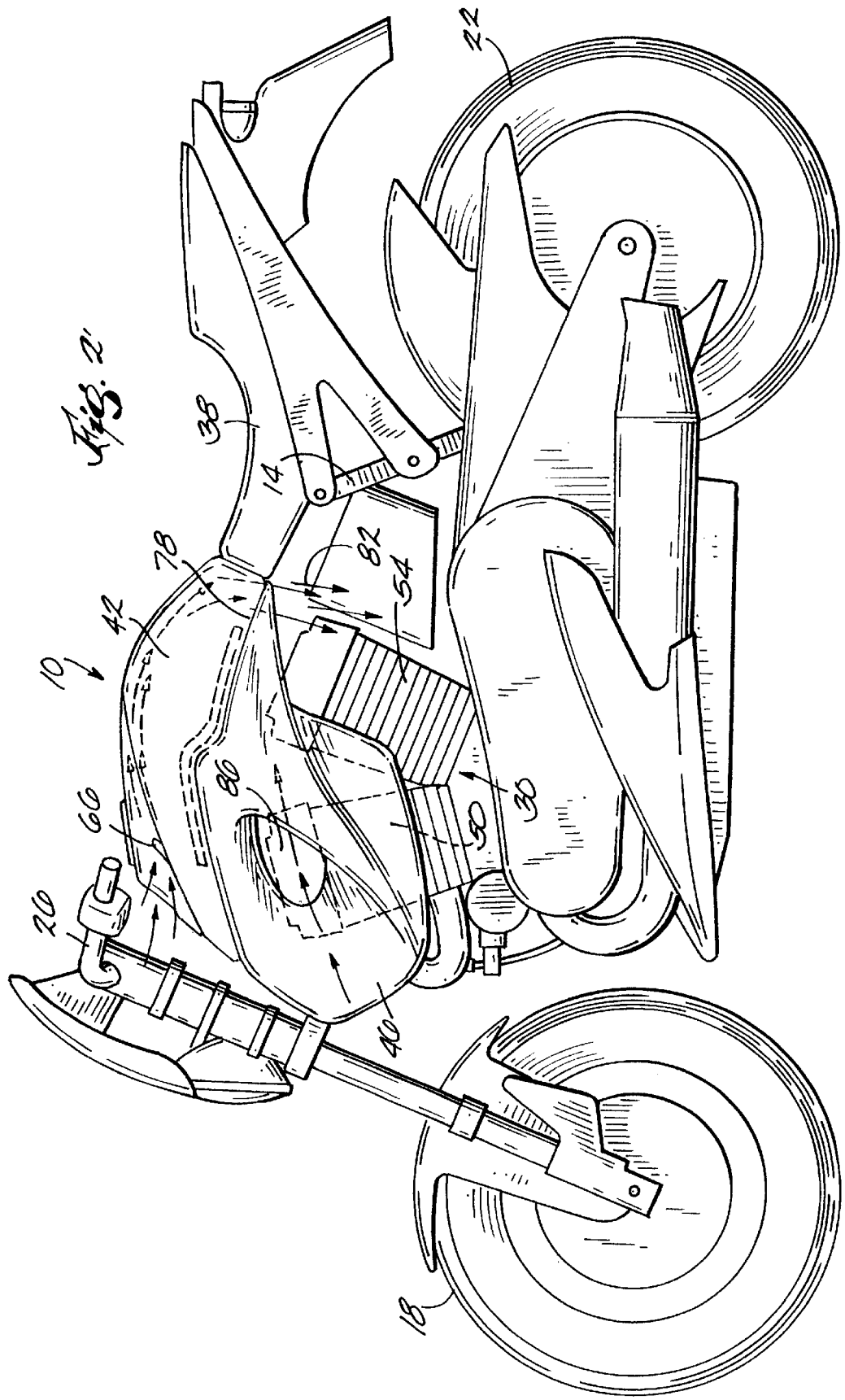
FIG. 2 is a left side elevational view of the motorcycle.
Figure 3:
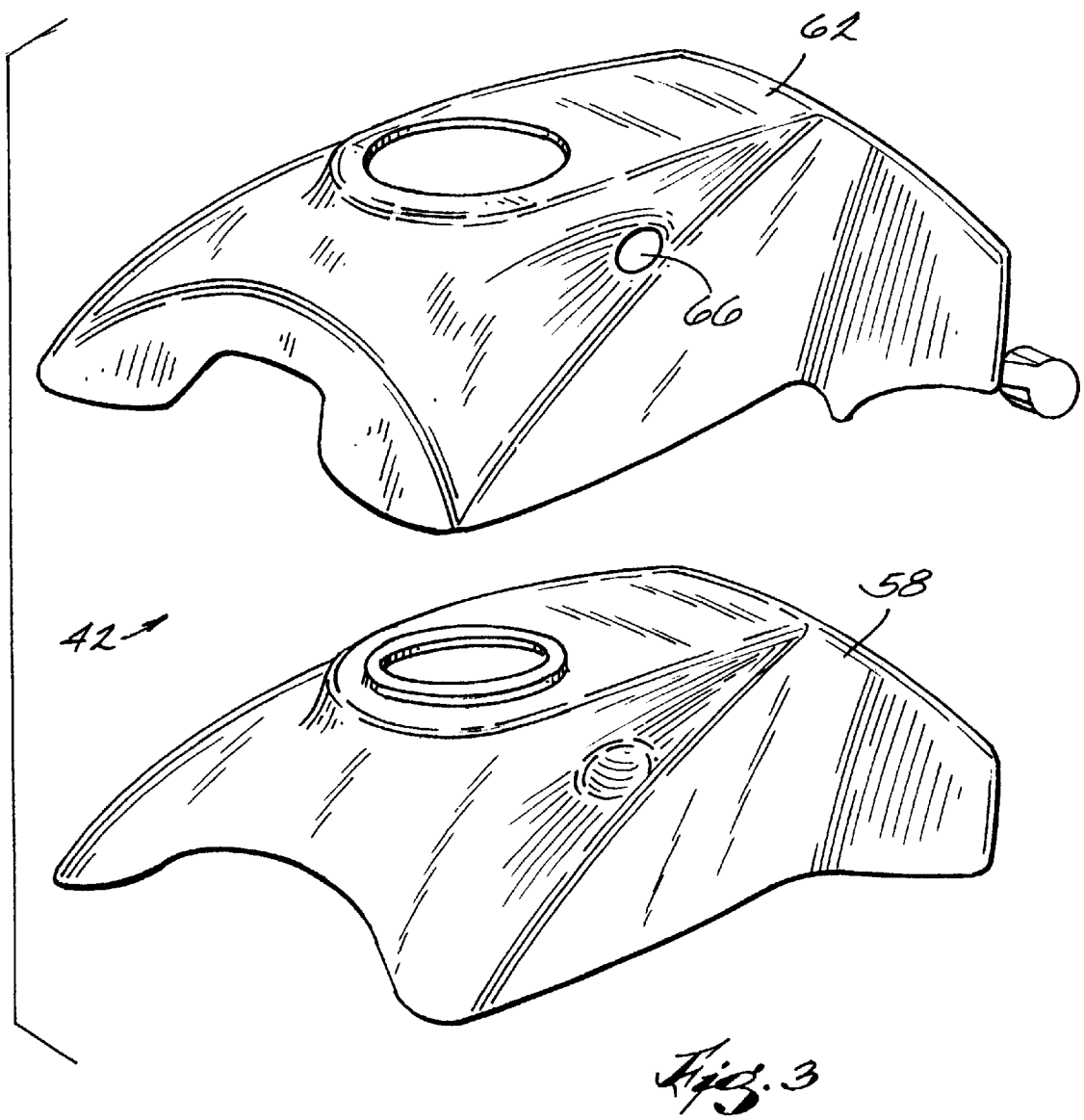
FIG. 3 is an exploded view of the fuel cell assembly.

FIG. 1 illustrates the right side of a motorcycle 10 including a frame 14, a front wheel 18, a rear wheel 22, handlebars 26, an engine 30, exhaust pipes 34, a seat 38, and a fuel cell assembly 42 positioned between the handlebars 26 and the seat 38. FIG. 2 illustrates the left side of the motorcycle 10, which further illustrates an air scoop 46. The direction of travel of the motorcycle 10 is to the right in FIG. 1, and to the left in FIG. 2.

The engine 30 is a V-twin style engine, having a front cylinder 50 and a rear cylinder 54. The engine 30 also has right and left side surfaces seen in FIGS. 1 and 2, respectively. The rear cylinder 54 is disposed behind the front cylinder 50 with respect the direction of travel of the motorcycle 10. Thus, the front cylinder 50 may receive a higher volume of direct air flow than the rear cylinder 54, because the front cylinder 50 partially blocks the rear cylinder 54.

As shown in FIGS. 3–8, the fuel cell assembly 42 includes a fuel tank 58 and a cover 62 for the fuel tank 58. The cover 62 includes a pair of forwardly-opening air inlets 66. The inlets 66 have a length of about 1.5 inches, and a width of about 1.25 inches.

A pair of air channels 70 (FIG. 7) are defined by the contours of the cover 62 and the fuel tank 58, and extend rearwardly from the air inlets 66 in a downstream direction. The air channels 70 have a height of about 0.75 inches and a width of about 1.5 inches at the inlet 66 end. In this regard, the channels 70 are substantially oval at their inlet 66 ends. The air channels 70 extend rearwardly at an angle α of between about 160°–178° with respect to the direction of travel of the motorcycle.

A foam strip 74 is affixed to one or both of the fuel tank 58 and the cover 62 (preferably, the cover 62) with adhesive, and extends from a point forward of the air inlets 66 to a point near the rear of the fuel cell assembly 42. The foam strip 74 provides a seal between the cover 62 and the fuel tank 58, such that air flowing through the air inlets 66 and air channels 70 does not escape the channels 70 until it reaches the end of the foam strip 74.

When the air reaches the end of the foam strip 74, it flows out of an outlet 78 between the fuel tank 58 and the cover 62. The fuel tank 58, the cover 62, and rear end of the foam strip 74 together define the outlet 78 at the downstream end of the air channel 70. The outlet 78 is about 3.5 inches long, and has a width defined by the space between the cover 62 and the fuel cell 58. The width increases from a minimum of about 0.5 inches to a maximum of about 0.75 inches. In this regard, the outlet 78 is substantially rectangular. The flow of air therefore enters each channel 70 as a substantially oval-shaped flow, and exits each channel 70 as a substantially flat sheet of air.

The flow of air through the channels 70 is indicated with arrows 82 in the drawings. Air enters the channels 70 in a direction substantially parallel to the direction of travel of the motorcycle 10. Air exiting the outlets 78 is deflected generally downwardly at an angle β of between about 90°–100°, and passes between the rider's legs and the engine 30, generally parallel to the outer surfaces of the engine 30. The substantially flat sheets of air exiting the outlets 78 provide a barrier between the engine 30 and the rider's legs, thereby reducing the amount of engine heat that reaches the rider's legs.

Referring now to FIGS. 2 and 4–9, the air scoop 46 is contoured to fit along the left side of the fuel cell assembly 42. Of course, the scoop 46 may alternatively be positioned on the right side of the fuel cell assembly 42, or on both the right and left sides of the fuel cell assembly 42. The scoop 46 defines an air intake 86 toward the front of the motorcycle 10, an air duct 90 extending rearwardly or downstream from the air intake 86, and an air outlet 94 at the downstream end of the duct 90. The intake 86 is defined by a contoured portion of the air scoop, and is elongated in a direction generally parallel to the direction of travel of the motorcycle 10. The intake 86 has a length of about 12 inches, and a height that tapers from about 6 inches to about 1.5 inches.

Figure 4:
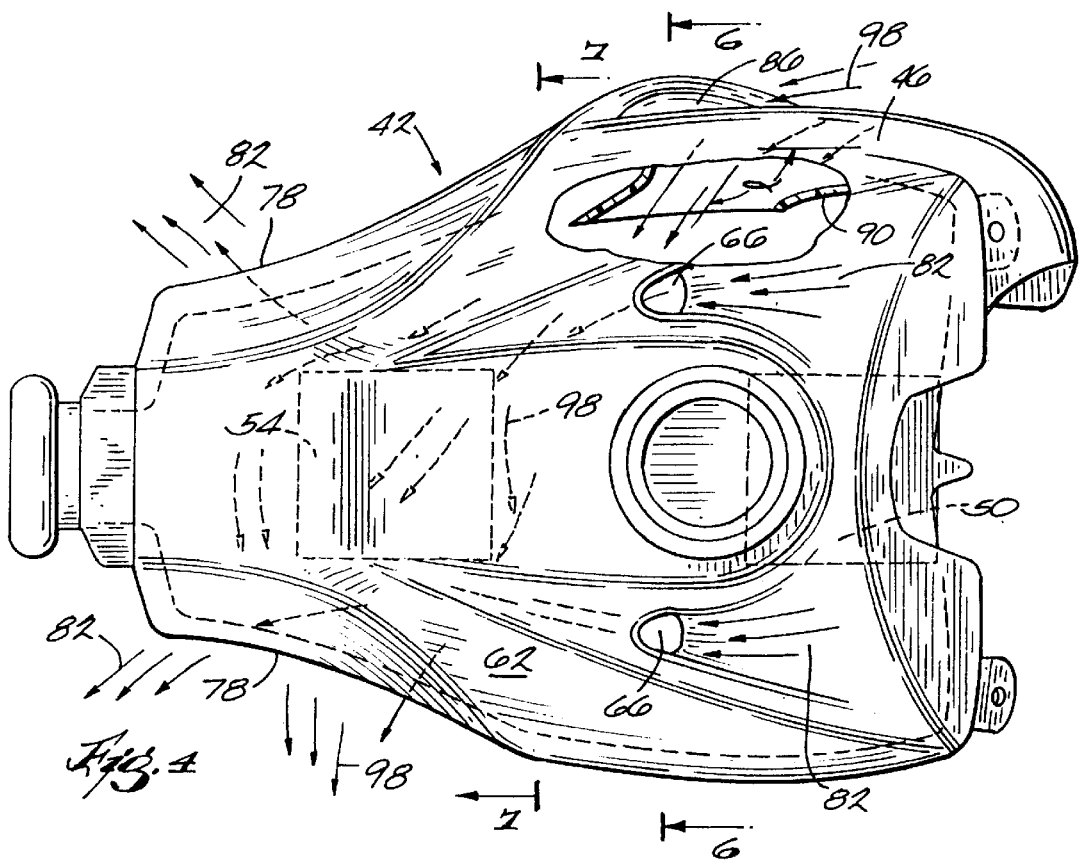
FIG. 4 is a top plan view of the fuel cell assembly and the air scoop.
Figure 5:
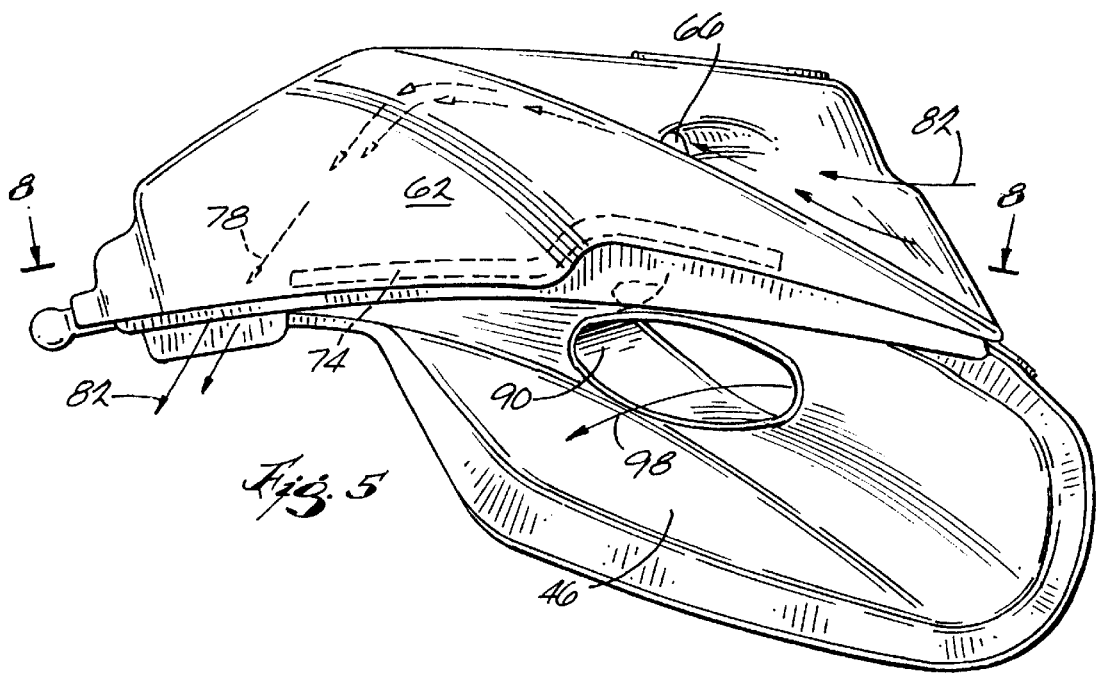
FIG. 5 is a side elevational view of the fuel cell assembly and the air scoop.
Figure 6:
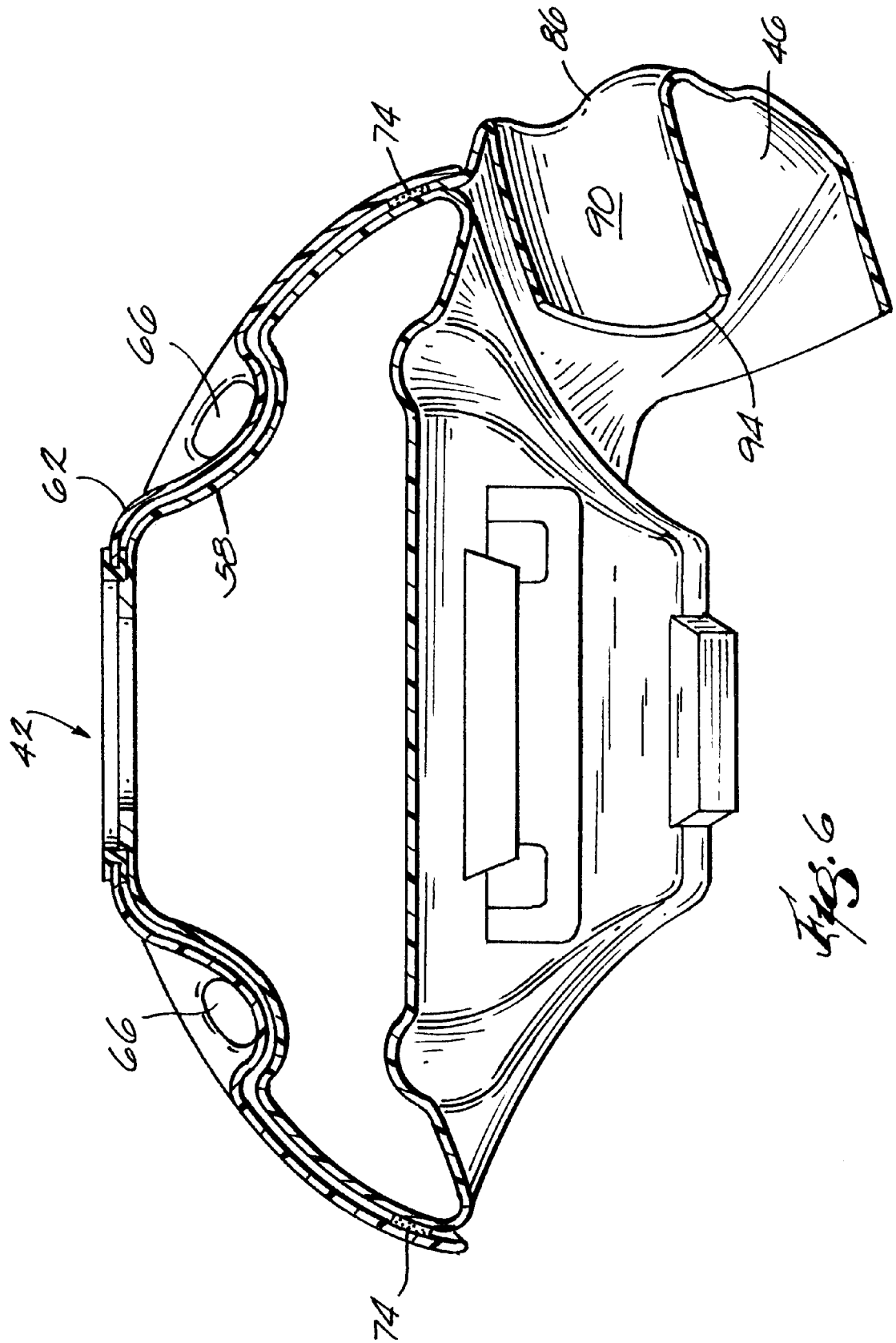
FIG. 6 is a cross-sectional view taken along line 6—6 in FIG. 4.
Figure 7:
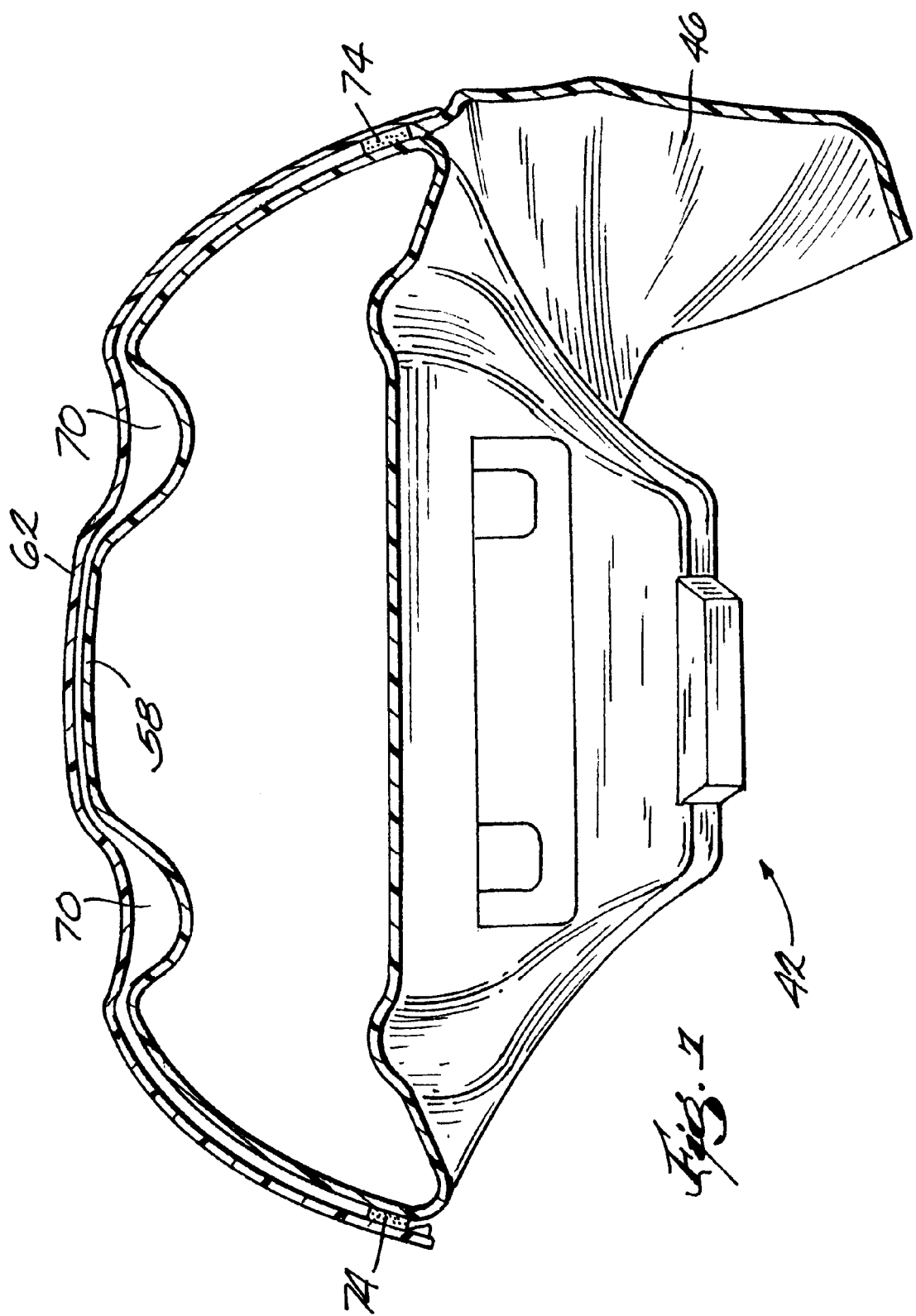
FIG. 7 is a cross-sectional view taken along line 7—7 in FIG. 4.
Figure 8:
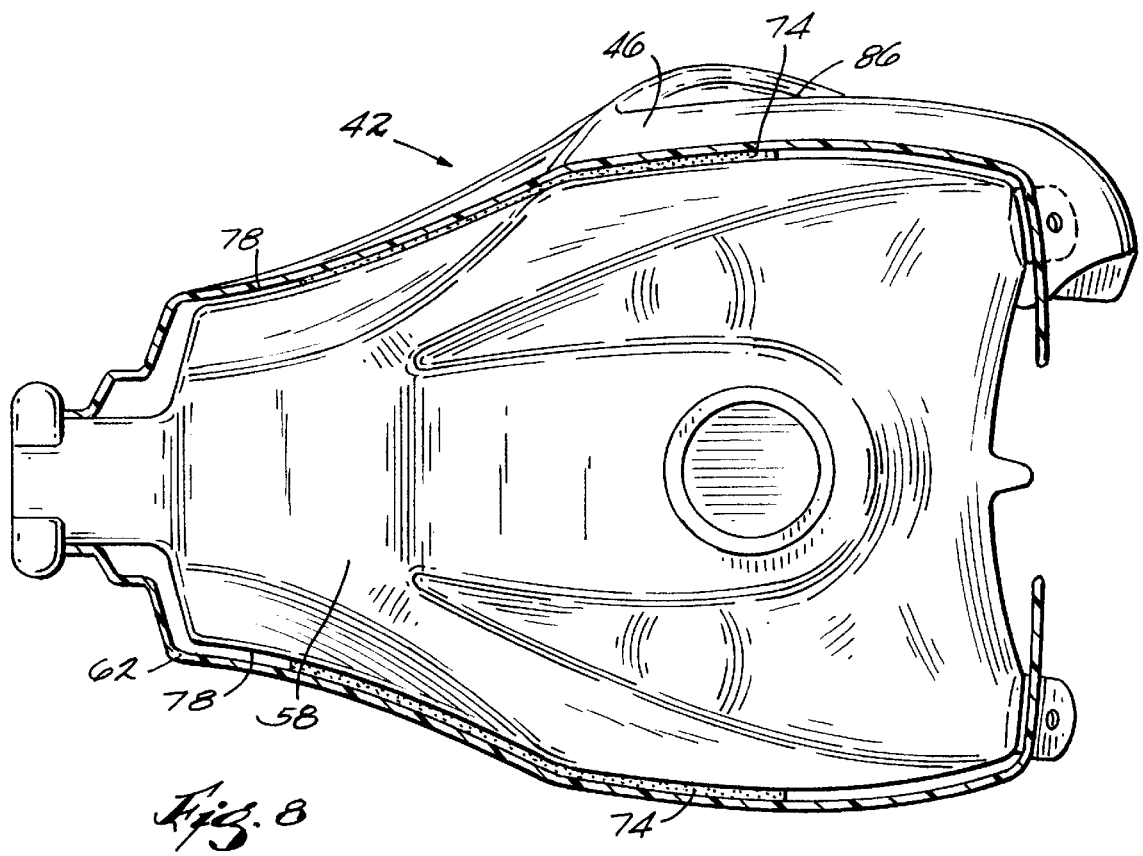
FIG. 8 is a cross-sectional view of the fuel cell assembly taken along line 8—8 in FIG. 5.
Figure 9:
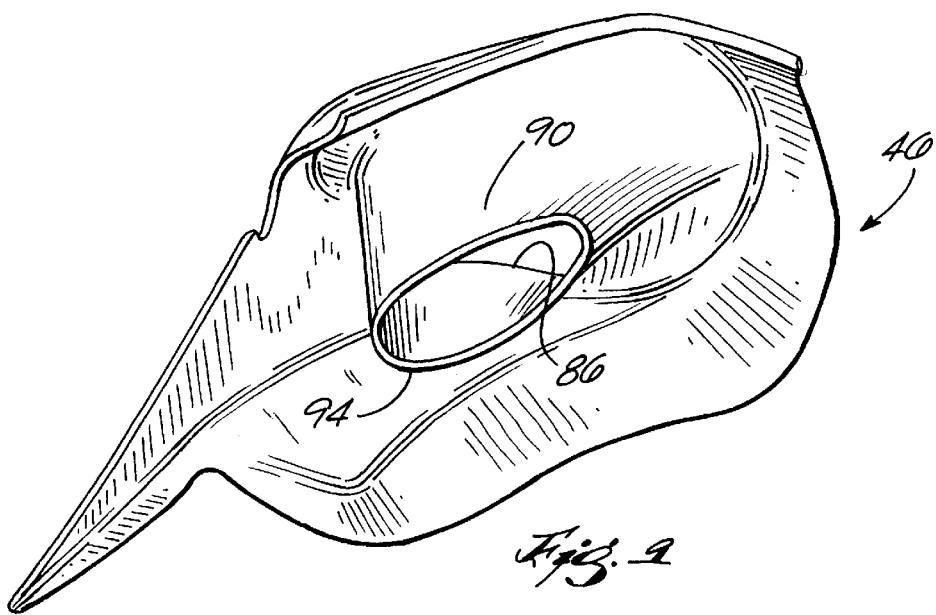
FIG. 9 is a perspective view of the inside of the air scoop.

The duct 90 is angled to direct air flowing out of the outlet 94 toward the rear cylinder 54 of the engine 30. The angle γ of the duct 90 is between about 120° and 130° with respect to the direction of travel of the motorcycle. The flow of air through the air scoop 46 and over the rear cylinder 54 is indicated with arrows 98 in the drawings. As seen in FIG. 4, the air scoop 46 directs a cross-flow path of air toward the rear cylinder 54. This flow of air cools to the rear cylinder 54 and may help equalize the performances of the front and rear cylinders 50, 54.

What is claimed is:

1. A motorcycle comprising a tank cover assembly including a tank and a cover disposed over a portion of said tank, said tank cover assembly defining at least one air inlet and at least one channel defined at least partially above said tank and extending rearwardly from said air inlet to an air outlet that directs air out of said channel.

2. The motorcycle of claim 1, further comprising an engine having opposed side surfaces, wherein said air outlet directs air generally parallel to at least one of said side surfaces.

3. The motorcycle of claim 1, wherein said at least one air inlet includes first and second inlets, and wherein said at least one channel includes first and second channels each associated with one of said first and second inlets.

4. The motorcycle of claim 1, wherein said inlet is on a top portion of said cover.

5. The motorcycle of claim 1, further comprising a seat and handlebars, wherein said tank cover assembly is positioned between said seat and said handlebars.

6. The motorcycle of claim 1, further comprising an elongated strip of foam positioned between said tank and said cover to at least partially define said channel.

7. The motorcycle of claim 1, wherein said air outlet directs air at least partially downward.

8. The motorcycle of claim 1, further comprising a seat, wherein said air inlet is positioned in front of said seat with respect to a direction of travel of said motorcycle.

9. A motorcycle comprising:
an engine having a front cylinder and a rear cylinder, said rear cylinder disposed at least partially behind said front cylinder with respect to a direction of travel of said motorcycle;
an air intake on a front portion of the motorcycle;
an air duct positioned to receive air from said air intake; and
an air outlet positioned to direct air flowing from said duct toward said rear cylinder from the side to create a cross-flow path of air directed toward said rear cylinder.

10. The motorcycle of claim 9, wherein said engine is a V-twin engine.

11. The motorcycle of claim 9, further comprising a tank and a cover, wherein said air duct is positioned below said cover.

12. The motorcycle of claim 11, wherein said air duct is disposed on only one side of said tank.

13. The motorcycle of claim 9, further comprising a tank cover assembly and a housing mounted to said tank cover assembly, wherein said air duct is defined by said housing.

14. The motorcycle of claim 9, wherein said duct is angled between about 120° and 130° with respect to a direction of travel of said motorcycle.

15. A motorcycle comprising a tank cover assembly including a tank and a cover disposed over a portion of said tank, said tank cover assembly defining at least one air inlet and at least one channel defined at least partially above said tank and extending rearwardly from said air inlet to an air outlet that directs air out of said channel, said motorcycle further comprising an engine having opposed side surfaces, wherein said air outlet directs air generally parallel to at least one of said side surfaces.

16. A motorcycle comprising a tank cover assembly including a tank and a cover disposed over a portion of said tank, said tank cover assembly defining at least one air inlet on a top portion of said cover and at least one channel defined at least partially above said tank and extending rearwardly from said air inlet to an air outlet that directs air out of said channel.

17. A motorcycle comprising:
an engine having a front cylinder and a rear cylinder, said rear cylinder disposed at least partially behind said front cylinder with respect to a direction of travel of said motorcycle;
an air intake on a front portion of the motorcycle;
an air duct angled between about 120° and 130° with respect to a direction of travel of said motorcycle and positioned to receive air from said air intake; and
an air outlet positioned to direct air flowing from said duct toward said rear cylinder.

* * * * *